Nov. 18, 1941.    C. W. FREDERICK ET AL    2,262,998
PHOTOGRAPHIC LENS
Filed May 17, 1940

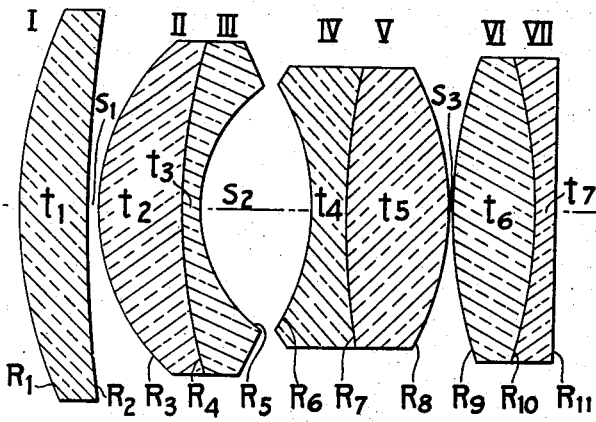

F = 100 mm    f/1.4

| LENS | GLASS | | RADII | SPACINGS |
|------|-------|---|-------|----------|
|      | $N_D$ | $\nu$ | | |
| I    | 1.639 | 55.5 | $R_1 = +\;73.5$ mm | $t_1 = 10.6$ mm |
|      |       |      | $R_2 = +242.7$     | $S_1 = 2.0$ |
| II   | 1.620 | 60.4 | $R_3 = +\;40.8$    | $t_2 = 18.7$ |
| III  | 1.567 | 42.8 | $R_4 = +541.3$     | $t_3 = 4.7$ |
|      |       |      | $R_5 = +\;23.3$    | $S_2 = 20.6$ |
| IV   | 1.647 | 33.9 | $R_6 = -\;41.8$    | $t_4 = 10.2$ |
| V    | 1.620 | 60.4 | $R_7 = +635.0$     | $t_5 = 31.4$ |
|      |       |      | $R_8 = -\;55.0$    | $S_3 = 2.6$ |
| VI   | 1.620 | 60.4 | $R_9 = +\;62.5$    | $t_6 = 20.0$ |
| VII  | 1.567 | 42.8 | $R_{10} = -\;87.1$ | $t_7 = 10.6$ |
|      |       |      | $R_{11} = \infty$  | |

F = 100 mm    f/1.4

| LENS | GLASS | | RADII | SPACINGS |
|------|-------|---|-------|----------|
|      | $N_D$ | $\nu$ | | |
| I    | 1.639 | 55.5 | $R_1 = +\;86.3$ mm | $t_1 = 12.6$ mm |
|      |       |      | $R_2 = +426.0$     | $S_1 = 2.0$ |
| II   | 1.639 | 55.5 | $R_3 = +\;40.5$    | $t_2 = 15.7$ |
| III  | 1.617 | 36.6 | $R_4 = +112.3$     | $t_3 = 3.5$ |
|      |       |      | $R_5 = +\;27.4$    | $S_2 = 20.9$ |
| IV   | 1.689 | 30.9 | $R_6 = -\;42.5$    | $t_4 = 6.7$ |
| V    | 1.639 | 55.5 | $R_7 = +267.0$     | $t_5 = 18.9$ |
|      |       |      | $R_8 = -\;52.5$    | $S_3 = .4$ |
| VI   | 1.744 | 45.8 | $R_9 = +\;84.6$    | $t_6 = 15.0$ |
| VII  | 1.617 | 36.6 | $R_{10} = -\;94.3$ | $t_7 = 3.9$ |
|      |       |      | $R_{11} = \infty$  | |

MAXIMILIAN J. HERZBERGER
CHARLES W. FREDERICK
INVENTORS
BY *Newton N. Perrico*
ATTORNEY Patented Nov. 18, 1941

2,262,998

UNITED STATES PATENT OFFICE 2,262,998

PHOTOGRAPHIC LENS

Charles W. Frederick and Maximilian J. Herzberger, Rochester, N. Y., assignors to Eastman Kodak Company, Rochester, N. Y., a corporation of New Jersey Application May 17, 1940, Serial No. 335,786

6 Claims. (Cl. 88—57)

This invention relates to lenses and particularly to high aperture photographic objectives.

It is an object of the invention to provide a high aperture lens with high covering power and good corrections for the various aberrations including spherical aberration, chromatic aberration, lateral color, curvature of field, astigmatism, sine condition, coma, distortion, Petzval condition, ghost images, vignetting, and flare.

Specifically it is the object of the invention to provide an f/1.4 or f/1.5 lens of high covering power and good correction.

It is an object of the invention to provide a lens of this type having a high degree of correction for rim rays. In fact, by the invention, practically perfect rim ray agreement can be attained.

Photographic objectives may be divided into certain types which are easily recognized by the lens designer. In a few rare instances there are border line cases which are a little difficult to define. However, in the case of the present invention, the type of lens is well known, namely that having four components the outer two of which are positive and the inner two are meniscus highly concave toward a diaphragm positioned therebetween. The various components of this type of lens may have many known forms. For example, the present invention may be combined with those described by George H. Aklin in copending applications Serial Nos. 335,782, 335,783 and 335,784, filed concurrently herewith. A modification of this invention is described in Herzberger's application Serial No. 335,785, also filed concurrently herewith. Thus, the various components may be compounded.

According to the present invention, a highly improved lens of this four component type is obtained by including in the rear component a cemented surface whose radius is between $-.5F$ $-5F$ preferably between $-.75F$ and $-2F$ where F is the focal length of the objective and which surface is between two elements the front one of which is positive and has an index of refraction at least .04 and preferably at least .07 greater than that of the rear element which is negative. Additional elements may be included in this component for additional corrections as described in Herzberger's application mentioned above. In the preferred form of our invention, we have found it also desirable to hold the ratios $R_6:R_5$ and $R_9:R_8$ between 5:4 and 5:2 and preferably between 4:3 and 2:1 where $R_5$, $R_6$, $R_8$ and $R_9$ are respectively the radii of curvatures of the rear surface of the second component, the front surface of the third component, the rear surface of the third component and the front surface of the fourth and rear component. These numbers subscript to the R in each case are the numbers of the surfaces consecutive from front to rear of the simplest form of the invention, but these ratios should hold whether or not any of the components are so complex that additional surfaces are present. That is, for example, the front surface of the third component should bear the prescribed ratio to the rear surface of the second component whether or not these surfaces happen to be the sixth and fifth respectively.

The rear component according to the invention should thus include at least a doublet with a positive high index element cemented to the front of a lower index negative element with a radius of curvature for the cemented surface preferably between $-.75F$ and $-2F$. In this preferred embodiment, the front surface of the positive element should have a radius of curvature between $.6F$ and $F$ and the rear surface of the negative element should have a radius between that of the cemented surface and infinity. Except for the ratios of radii described, the front three components adhere generally to the established rules for lenses of this type.

In the accompanying drawing there is shown:

Two preferred embodiments of our invention.

The specification corresponding to the drawing are as follows:

| F=100 mm. | | | f/1.4 |
|---|---|---|---|
| Lens | Glass | Radii | Spacings |
| | $N_D$    $\nu$ | | |
| I | 1.639   55.5 | $R_1=+73.5$ mm. | $t_1=10.6$ mm. |
| | | $R_2=+242.7$ | $s_1=2.0$ |
| II | 1.620   60.4 | $R_3=+40.8$ | $t_2=18.7$ |
| III | 1.567   42.8 | $R_4=+541.3$ | $t_3=4.7$ |
| | | $R_5=+23.3$ | $s_2=20.6$ |
| IV | 1.647   33.9 | $R_6=-41.8$ | $t_4=10.2$ |
| V | 1.620   60.4 | $R_7=+635.0$ | $t_5=31.4$ |
| | | $R_8=-55.0$ | $s_3=2.6$ |
| VI | 1.620   60.4 | $R_9=+62.5$ | $t_6=20.0$ |
| VII | 1.567   42.8 | $R_{10}=-87.1$ | $t_7=10.6$ |
| | | $R_{11}=\infty$ | |

| Lens | Glass | | Radii | Spacings |
|---|---|---|---|---|
| | $N_D$ | $\nu$ | | |
| I | 1.639 | 55.5 | $R_1 = +86.3$ mm. | $t_1 = 12.6$ mm. |
| | | | $R_2 = +426.0$ | $s_1 = 2.0$ |
| II | 1.639 | 55.5 | $R_3 = +40.5$ | $t_2 = 15.7$ |
| III | 1.617 | 36.6 | $R_4 = +112.3$ | $t_3 = 3.5$ |
| | | | $R_5 = +27.4$ | $s_2 = 20.9$ |
| | | | $R_6 = -42.5$ | |
| IV | 1.689 | 30.9 | $R_7 = +267.0$ | $t_4 = 6.7$ |
| V | 1.639 | 55.5 | $R_8 = -52.5$ | $t_5 = 18.9$ |
| | | | $R_9 = +84.6$ | $s_3 = .4$ |
| VI | 1.744 | 45.8 | $R_{10} = -94.3$ | $t_6 = 15.0$ |
| VII | 1.617 | 36.6 | $R_{11} = \infty$ | $t_7 = 3.9$ |

F = 100 mm.   f/1.4

Having thus described two preferred embodiments of our invention, we wish to point out that it is not limited to these specific structures but is of the scope of the appended claims.

What we claim and desire to secure by Letters Patent of the United States is:

1. A photographic objective of the type having four axially spaced components of which the two outer ones are positive and the two inner ones are menisci highly concave toward a diaphragm therebetween characterized by the rear component being compound with a cemented surface concave toward the diaphragm and having a radius of curvature between $-.5F$ and $-5F$ where F is the focal length of the objective and which surface separates two glasses the front one of which has an index of refraction at least .04 greater than that of the other.

2. A photographic objective according to claim 1 further characterized by the ratios $R_6:R_5$ and $R_9:R_8$ being between 5:4 and 5:2 where $R_5$, $R_6$, $R_8$ and $R_9$ are respectively the radii of curvature of the rear surface of the second component, the front surface of the third component, the rear surface of the third component and the front surface of the fourth and rear component.

3. A photographic objective of the type having four axially spaced components of which the two outer ones are positive and the two inner ones are menisci highly concave toward a diaphragm therebetween characterized by the rear component being at least a doublet with a positive element cemented to the front of a negative element whose index of refraction is at least .04 less than that of the positive element, the front surface of the positive element being convex toward the diaphragm and having a radius of curvature between .5F and 5F where F is the focal length of the objective, the cemented surface being concave toward the diaphragm and having a radius of curvature between $-.5F$ and $-5F$ and the rear surface of the negative element being plano or concave toward the diaphragm and having a radius of curvature between $-.5F$ and infinity.

4. A photographic objective of the type having four axially spaced components of which the two outer ones are positive and the two inner ones are menisci highly concave toward a diaphragm therebetween characterized by the ratios $R_6:R_5$ and $R_9:R_8$ being between 4:3 and 2:1 where $R_5$, $R_6$, $R_8$ and $R_9$ are respectively the radii of curvature of the rear surface of the second component, the front surface of the third component, the rear surface of the third component, and the front surface of the fourth and rear component, and by the rear component being a doublet with a positive element cemented to the front of a negative element whose index of refraction is at least .07 less than that of said positive element, the front surface of the rear component being convex toward the diaphragm and having a radius of curvature between .6F and F, the cemented surface of the rear component being concave toward the diaphragm and having a radius of curvature between $-.75F$ and $-2F$ and the rear surface of the rear component being plano or concave toward the diaphragm and having a radius of curvature greater than that of the cemented surface of this rear component.

5. A photographic objective according to claim 1 further characterized by said front one of the two glasses of the rear component having an index of refraction greater than 1.7 and by all the elements in the objective having indices of refraction greater than 1.6.

6. A photographic objective according to claim 4 further characterized by said front one of the two glasses of the rear component having an index of refraction greater than 1.7 and by all of the elements in the objective having indices of refraction greater than 1.6.

CHARLES W. FREDERICK.
MAXIMILIAN J. HERZBERGER.